United States Patent Office 3,417,783
Patented Dec. 24, 1968

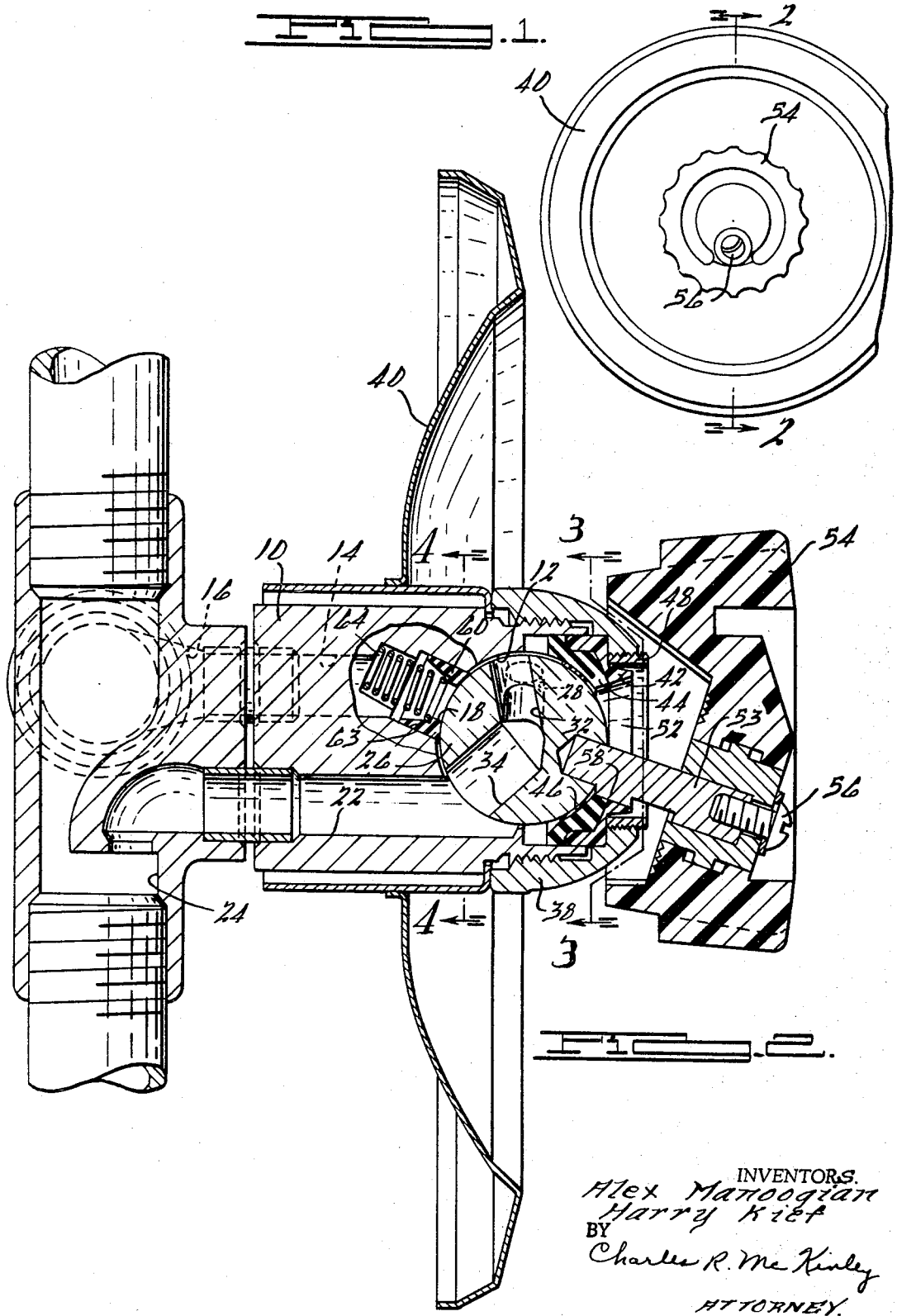

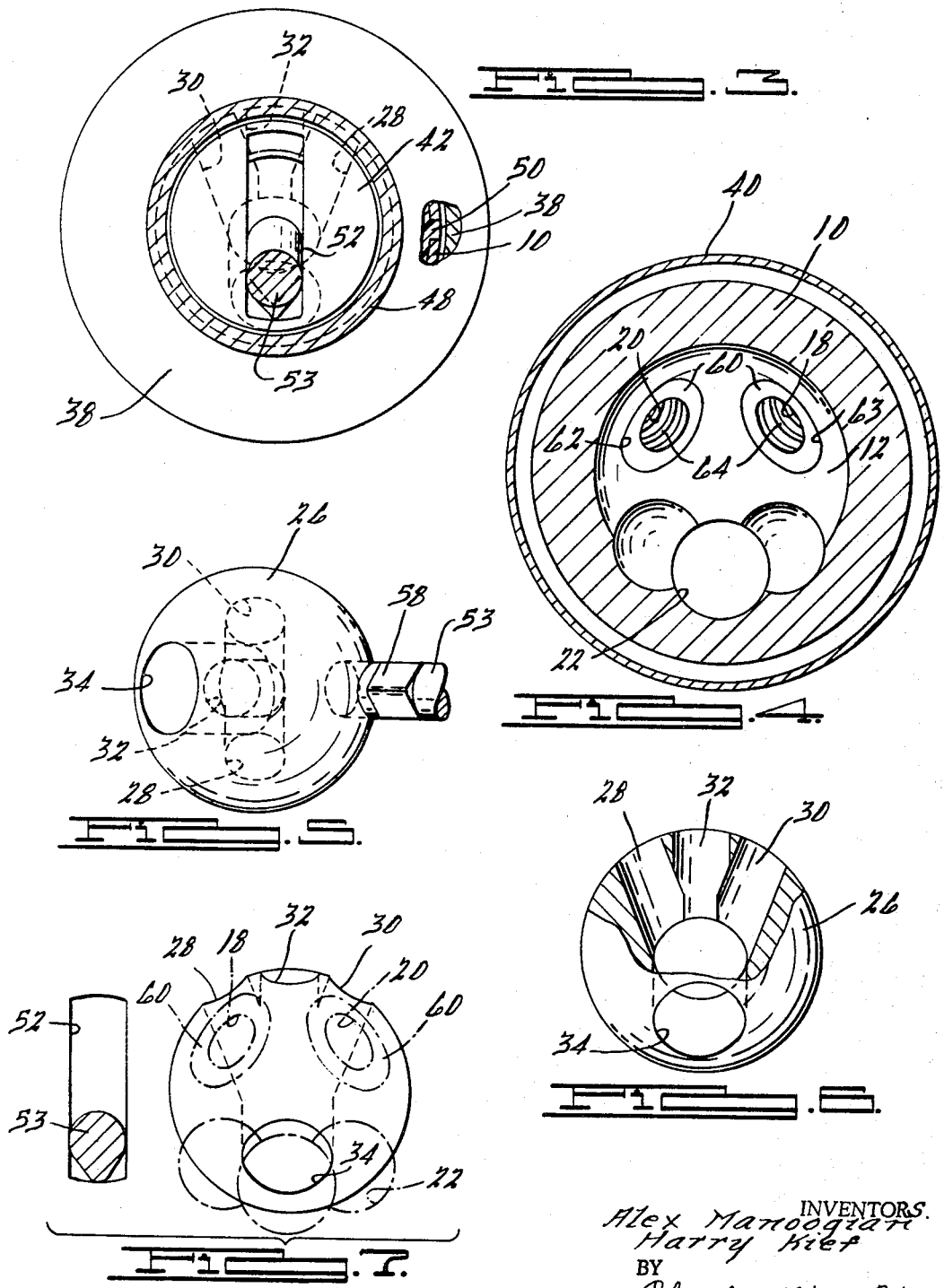

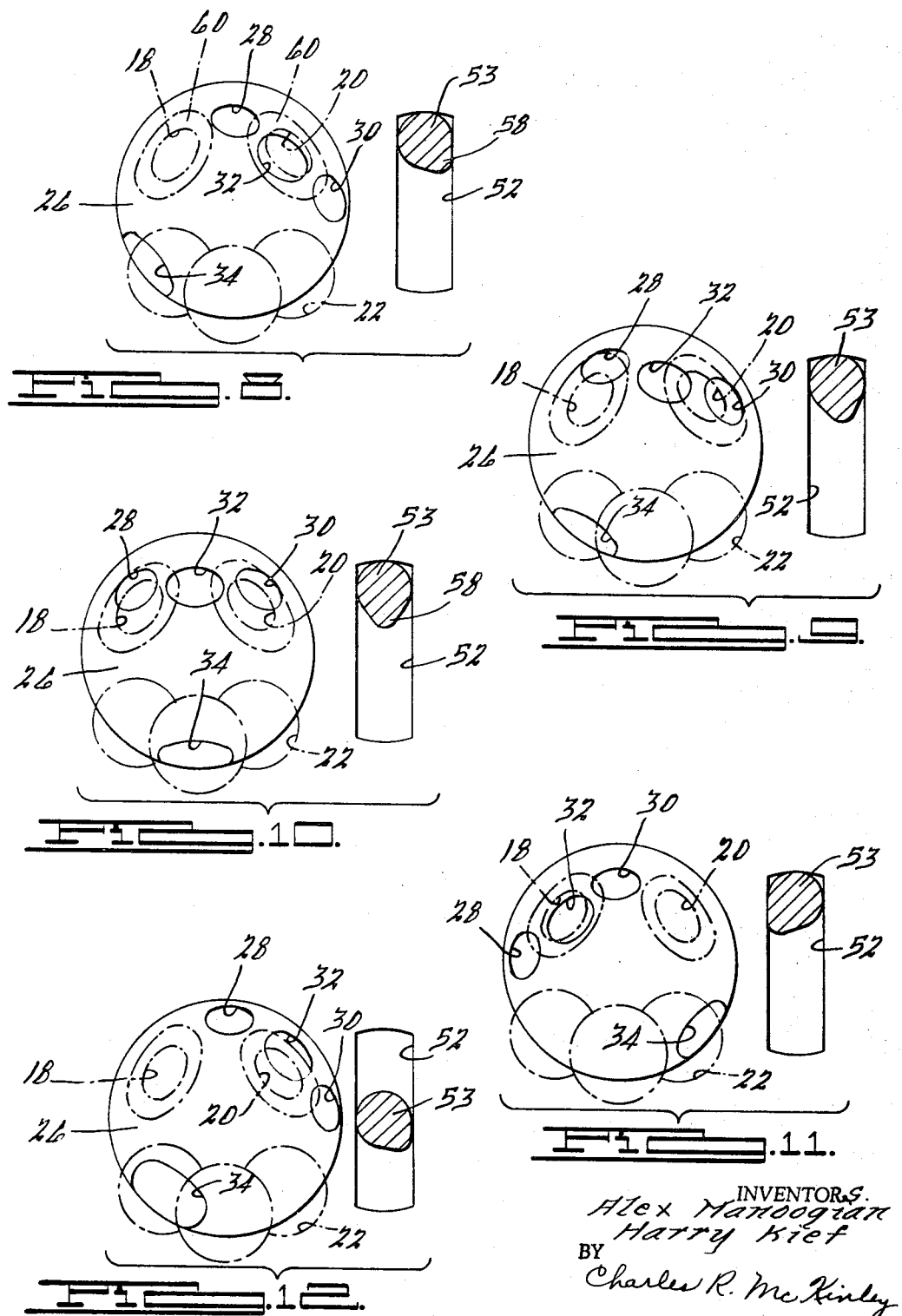

3,417,783
MIXING VALVE
Alex Manoogian, Detroit, and Harry Kief, Allen Park, Mich., assignors, by mesne assignments, to James E. Meagher, Altadena, Calif.
Filed May 3, 1965, Ser. No. 452,696
6 Claims. (Cl. 137—625.41)

ABSTRACT OF THE DISCLOSURE

A single handle mixing faucet of the ball type wherein the hot and cold water inlets open into a valve seat in the valve body and a valve member is movable against the valve seat and has three inlet ports therein in constant fluid flow communication with an outlet duct in the valve seat. The valve member is rotatable about two mutually perpendicular axes so that one of the inlet ports in the valve member may be communicated only with the hot water inlet, another inlet port may be communicated only with the cold water inlet, and the third inlet port may be communicated with either the hot or cold water inlet.

---

This invention relates to an improved ball type mixing valve and specifically to a ball type mixing valve used to mix hot and cold water in which the ball valve is provided with three fluid inlet ports cooperable with fixed hot and cold inlets in the valve seat whereby the valving action is improved. In prior ball type mixing valves such as the valve disclosed in Adams et al. U.S. Letters Patent No. 3,056,418, the ball valve generally contains two inlet ports which move relative to the two fluid inlets in the seat of the valve so as to alter the flow and mix of the fluid passing through the valve. Our valve is an improvement over prior type valves in that our valve member has three inlet ports which are used to control the flow of hot and cold water through the valve so as to selectively vary the mix and flow to insure that the mix will be varied uniformly as the valve is moved from the full hot to the full cold positions, thus making it easier to estimate the output mix by the position of the valve handle.

Additionally, our valve construction provides an improved arrangement to orient the ball relative to the valve seat and eliminates problems of wear inherent in prior constructions.

It is conventional to provide sealing elements at the inlets in the valve seat. These elements are made of flexible material which is deformed as the inlet ports in the ball valve pass over them. In our construction the three inlet ports in the ball valve are not in contact with the sealing members when the ball is in the "off" position so that there is no possibility that the sealing members will become permanently deformed during the protracted periods while the ball valve is in the "off" position. This construction increases the useful life of the sealing members, thereby eliminating possible leaks in the valve unit.

Accordingly, the principal object of our invention is to provide an improved ball type mixing valve.

Another object of the invention is to provide a ball type mixing valve with three inlets in the ball whereby it is possible to selectively vary the fluid mix and flow through the valve in an improved manner.

A further objective is to provide a ball type mixing valve wherein the sealing members have an increased useful life.

Other and further objects of the invention will be apparent from the following description and claims and may be understood by reference to the accompanying drawings, of which there are three sheets, which by way of illustration show a preferred embodiment of our invention and what we now consider to be the best mode of applying the principles thereof. Other embodiments of the invention may be used without departing from the scope of the present invention as set forth in the appended claims.

In the drawings:

FIGURE 1 is a front elevational view of the valve;

FIGURE 2 is a view taken along line 2—2 of FIGURE 1 and showing the valve in the "off" position;

FIGURE 3 is a view taken along line 3—3 of FIGURE 2;

FIGURE 4 is a view taken generally along line 4—4 of FIGURE 2, with the mixing ball removed from the socket in the valve body;

FIGURE 5 is a bottom view of the mixing ball;

FIGURE 6 is a view of the ball showing the inlet and outlet construction thereof; and FIGURES 7 through 12 are views taken from the rear of the valve socket in the valve body and showing the relative positions of the inlet ports and outlet of the ball, together with the position of the inlets and outlet in the valve body as the ball is moved in relation to the body of the valve so as to vary the mix and flow of the fluid passing therethrough.

As shown in the drawings and particularly in FIGURES 2 through 6, our valve comprises a metal valve body 10 with a spherical valve seat 12 at one end thereof. The valve body has a cold water inlet passageway 14 passing therethrough. The passageway 14 is connected to a cold water source 16 from which cold water is supplied to the valve. The inlet passageway 14 ends in a cold water inlet 18 in the valve seat 12. A hot water inlet passageway (not shown) connects a hot water source with the hot water inlet 20 also positioned within the spherical seat 12 so as to supply hot water thereto. An outlet duct 22 connects the valve seat 12 with a discharge system 24 which is conventionally known in the art.

A spherical ball valve 26 is positioned within the seat 12. The ball valve has an end inlet port 28 which communicates with the cold water inlet 18. A similar end inlet port 30 communicates with the hot water inlet 20. A center inlet port 32 is positioned intermediate the two end inlet ports 28 and 30 and may be brought into communication with either the hot or cold inlets 18 and 20. All three of the ball inlet ports 28, 30 and 32 communicate with an outlet port 34. The outlet port is in continuous fluid flow relation with the outlet duct 22 regardless of the position of the inlet ports relative to the inlets.

A cap 38 is threadedly secured to the end of the valve body and holds escutcheon plate 40 to the valve. A nylon ring 42 carries a rubber sealing gasket 44 therein and is urged toward the ball valve 26 by means of the adjustment ring 48 which is threadedly engaged with the cap 38. The surface of the sealing gasket 44 which is adjacent the ball valve 26 is provided with a Teflon plastic retaining gasket 46 which abuts the ball valve and forms a seal between the ball and the gasket 44. The gasket 44 forms a positive seal with the interior of the valve body 10 so that when the adjustment ring 48 is tightened so as to position the gaskets against the valve body 10 and the ball valve 26, an effective fluid seal is formed between the ball and the valve body. The nylon ring 42 is provided with a key 50 as shown in FIGURE 3. The key 50 fits in a slot within the body of the valve 10 so as to prevent rotation of the nylon ring as the adjustment ring 48 is tightened to position the sealing gasket against the ball valve and body.

The Teflon sealing gasket 46 represents an improvement over conventional ball valve sealing means in which the rubber sealing gasket 44 is used to make a seal with the ball. The Teflon is slicker than the rubber and thus enables the adjustment ring 48 to be adjusted more tightly to improve the seal, while the force necessary to rotate the ball in the valve is maintained at a low level. Further, as the ball is moved in the valve, the Teflon tends to fill any irregularities on the surface of the ball so that the friction between the ball and the gasket 46 is kept at a minimum.

The inlet ends of the hot and cold inlet passageways are enlarged at 62 and 63 so as to accommodate annular sealing gaskets 60. Springs 64 react against the body 10 and the gaskets 60 so as to urge the gaskets against the ball 26. The downstream ends of the gaskets 60 conform to the shape of the ball so that the springs, together with the fluid pressure within the inlet, assure a positive fluid seal between the gaskets 60 and the ball. The fluid pressure within the passageways reacts on the side walls of the gaskets 60 so as to make a positive seal with the enlarged portions 62 and 63 of the inlet passageways.

The ball is provided with a stem 53 which projects through a slot 52 within the nylon ring 42. The stem 53 has a stop 58 thereon as shown in FIGURES 2, 5, and 8. The stop cooperates with the slot 52 so as to limit rotation of the stem in the slot. A handle 54 is attached to the outwardly projecting end of the stem 52 by means of screw 56 so that the ball valve 26 may be rotated about the axis of the stem 53 and may be independently rotated about a second axis by moving the stem in the slot 52. As illustrated in the representational sketches shown in FIGURES 7 through 12, the stop 58 limits the degree of rotation of the ball about the axis of the stem while the ends of the slot 52 limit the degree to which the ball may be rotated by rocking the stem in the slot.

The ball may be rotated about two axes. The first axis is fixed relative to the body 10 and is parallel to a line joining the centers of the inlets 18 and 20. The ball is rotated about this axis by rocking the stem 53 up and down in the slot 52. Rotation about this axis varies the flow of the fluid passing through the valve. The second axis about which the ball may be rotated, the axis of the stem 53, is fixed relative to the ball and is perpendicular to the first axis. Rotation about this axis varies the mix of the fluid passing through the valve. By proper manipulation of the handle 54, it is possible to rotate the ball about either axis while maintaining its position relative to the other axis.

In FIGURE 2 the valve is shown in the "off" position in which the inlet ports 28, 30 and 32 of the ball are out of communication with the inlets 18 and 20. FIGURE 7 corresponds to this position and shows the inlet ports 28, 30 and 32 rotated away from the inlets 18 and 20 and from the sealing faces of the gaskets 60. The representational drawing associated with FIGURE 7 shows the position of the stem 53 in the slot 52, which corresponds to the position of the ball as shown.

In FIGURE 8 showing the full "hot" position, the ball has been rotated about the first axis to the maximum extent by moving the stem to the top of the slot 52. It also has been rotated about the second axis until the stop 58 has contacted the side of the slot 52. The center inlet port 32 is in full flow relation with the hot water inlet 20 and the end inlet ports 28 and 30 are closed off. Thus in the full "hot" position, undiluted hot water passes through the hot water inlet 20, the center inlet port 32, and out the outlet port 22.

The mix of the fluid passing through the valve is varied by rotating the ball about the second axis so that if the stem is maintained adjacent the upper end of the slot 52 and is rotated clockwise slightly as shown in FIGURE 9, the flow through the valve will remain constant but will have a proportion of cold water so that the fluid temperature will be decreased. The center inlet port through which the hot water flows in the full "hot" position is moved away from the hot water inlet 20 and toward the cold water inlet 18, while the end inlet port 28 is moved into partial engagement with the cold water inlet 18 and the end inlet port 30 is moved into partial engagement with the hot water inlet 20.

When the stem is rotated to the intermediate full flow position as shown in FIGURE 10 there is no flow through the center inlet port 32 and the end inlet ports 28 and 30 each pass an equal flow of hot and cold water from the hot and cold inlets 20 and 18 respectively.

With continued clockwise rotation of the stem in the full flow position, the full cold position is reached as shown in FIGURE 11 where the entire flow is through the center inlet port 32 which is in complete engagement with the cold inlet 18 and the end inlet ports 28 and 32 are disengaged from either inlet 18 or 20.

By moving the stem 53 down the slot 52 to the position as shown in FIGURE 12 where the stem is rotated about its own axis to a maximum hot flow position, the center inlet port 30 is partially engaged with the hot inlet 20 so that only hot water flows through the valve. In this position the rate of hot water flow through the valve is less than when the valve is in the full hot flow position of FIGURE 8 due to the fact that the center inlet port 30 is only partially exposed to the hot water inlet 20. When the stem 53 is rotated about its axis in a clockwise manner, the inlet ports 28, 30 and 32 sweep across the hot and cold inlets 20 and 18 in a fashion similar to the above described full flow operation of the valve, the only difference being that the areas of the inlet ports exposed to the inlets are less than in the full flow case so that the total flow through the valve is decreased.

Although we have illustrated the operation of the valve by a series of figures showing rotation about the second axis while the valve is held fixed relative to the first axis, it is clear that the valve may be rotated relative to the first axis while held fixed relative to the second axis. Thus the ball may be moved independently of either axis so as to independently vary the mix or flow of the fluid passing therethrough. This construction represents an improvement over that of conventional ball type mixing valves in that it allows the valve to be preset as to the mix by rotating the ball about the second axis when the valve is in the "off" position. The valve may then be opened to any given flow position by rotating the ball about the first axis so as to select the desired output volume of the predetermined mix.

In conventional ball type mixing valves the mix adjustment at the low flow rates is sensitive to the position of the ball and makes the selection of a given mix at a low flow rate difficult. With my mixing valve the mix is varied by rotating the ball through the same arc, regardless of the flow setting, thus facilitating the selection of a given mix at low flow settings.

While we have illustrated and described a preferred embodiment of our invention, it is understood that this is capable of modification and we therefore do not wish to be limited to the precise details set forth but desire to avail ourselves of such changes and alterations as fall within the purview of the following claims.

We claim:
1. A mixing valve comprising a body having two inlet passageways, an outlet duct, and a generally spherical valve seat located therein with the inlet passageways ending in two inlets in the seat and with the duct in fluid flow communication with the seat, a generally spherical ball valve positioned within the seat and having two end inlet ports and a center inlet port, each inlet port being located in continuous fluid flow communication with the outlet duct, the center inlet port located intermediate the two end inlet ports, means confining the ball valve within the seat, and means limiting motion of the ball valve to rotation about two mutually perpendicular axes so that one inlet port may be brought into fluid flow communication with one inlet only, the second end inlet port may be brought into fluid flow communication with the second inlet only, and the center inlet port may be brought into fluid flow communication with either inlet.

2. A mixing valve comprising a body having two inlet passageways, an outlet duct, and a generally spherical valve seat located therein with the inlet passageways ending in two inlets in the seat and with the duct in fluid flow communication with the seat, a generally spherical ball valve positioned within the seat and having two end inlet ports and a center inlet port, each inlet port being located in continuous fluid flow communication with the outlet duct, the center inlet port located intermediate the two end inlet ports, means confining the ball valve within the seat, and means limiting motion of the ball valve to rotation about two mutually perpendicular axes, the first axis being fixed relative to the body and running parallel to a line joining the centers of the two inlets, the second axis being fixed relative to the ball and located in a plane perpendicular to a line joining the centers of the two end inlet ports and being equidistant from such centers, so that one inlet port may be brought into fluid flow communication with one inlet only, the second end inlet port may be brought into fluid flow communication with the second inlet only, and the center inlet port may be brought into fluid flow communication with either inlet.

3. A mixing valve as defined in claim 2 wherein the second axis lies at the intersection of said plane and a second plane located perpendicular to the first-mentioned line and equidistant from the centers of the two inlets.

4. A mixing valve comprising a body having two inlet passageways, an outlet duct, and a generally spherical valve seat located therein with the inlet passageways ending in two inlets in the seat and with the duct in fluid flow communication with the seat, a generally spherical ball valve positioned within the seat and having two end inlet ports and a center inlet port, each inlet port being located in continuous fluid flow communication with the outlet duct, the center inlet port located intermediate the two end inlet ports, means confining the ball valve within the seat, and means limiting motion of the ball valve relative to the seat so that one end inlet port may be brought into fluid flow communication with one inlet only, the second end inlet port may be brought into fluid flow communication with the second inlet only, the center inlet port may be brought into fluid flow communication with either inlet, and each inlet may be in fluid flow communication with both its respective end inlet port and the center inlet port.

5. A mixing valve comprising a body having two inlet passageways, an outlet duct, and a generally spherical valve face with the inlet passageways ending in two inlets in said face and with the duct being in fluid flow communication with said face, a valving member having a generally spherical surface positioned next to said face and having two end inlet ports and a center inlet port, each inlet port being located on said surface and being in fluid flow communication with the outlet duct in all positions of said valving member, the center inlet port being located intermediate the two end inlet ports, means limiting motion of the valving member relative to the body to rotation about two mutually perpendicular axes, the first axis being fixed relative to the body and running parallel to a line joining the centers of the two inlets, the second axis being fixed relative to the valving member and being located in a plane perpendicular to a line joining the centers of the end inlet ports and located midway therebetween so that one inlet port may be brought into fluid flow communication with one inlet only, the second inlet port may be brought into fluid flow communication with the second inlet only, the center inlet port may be brought into fluid flow communication with either inlet, and each inlet may be in fluid flow communication with both its respective end inlet port and the center inlet port.

6. A mixing valve comprising a body having two inlet passageways, an outlet duct, and a generally spherical valve face with the inlet passageways ending in two inlets in said face and with the duct being in fluid flow communication with said face, a valving member having a generally spherical surface positioned next to said face and having two end inlet ports and a center inlet port, each inlet port being located on said surface and being in constant fluid flow communication with the outlet duct, the center inlet port being located intermediate the two end inlet ports, means limiting motion of the valving member relative to the body to rotation about two mutually perpendicular axes, the first axis being fixed relative to the body and running parallel to a line joining the centers of the two inlets, the second axis being fixed relative to the valving member and being located in a plane perpendicular to a line joining the centers of the end inlet ports and located midway therebetween so that rotation of the valving member about the first axis moves the inlet ports toward and away from the inlets to vary the flow of the fluid passing through the valve and rotation of the valving member about the second axis moves the inlet ports across the inlets to vary the mix of said flow.

References Cited

UNITED STATES PATENTS

| | | | |
|---|---|---|---|
| 2,490,726 | 12/1949 | Bauberger | 137—625.17 |
| 2,845,948 | 8/1958 | Parker | 137—625.17 |
| 164,448 | 6/1875 | Hallett | 137—625.41 |
| 1,614,437 | 1/1927 | Cochran | 137—625.41 |
| 2,845,949 | 8/1958 | Parker | 137—625.41 |
| 2,911,009 | 11/1959 | Parker | 137—625.41 |
| 3,043,337 | 7/1962 | Jansen | 137—625.41 |
| 3,132,836 | 5/1964 | Dickerson et al. | 251—368 X |
| 3,156,260 | 11/1964 | Harvey et al. | 137—625.41 |
| 3,167,086 | 1/1965 | Michalski | 137—625.41 |

FOREIGN PATENTS 1,141,844  12/1962  Germany.

M. CARY NELSON, *Primary Examiner.*